UNITED STATES PATENT OFFICE.

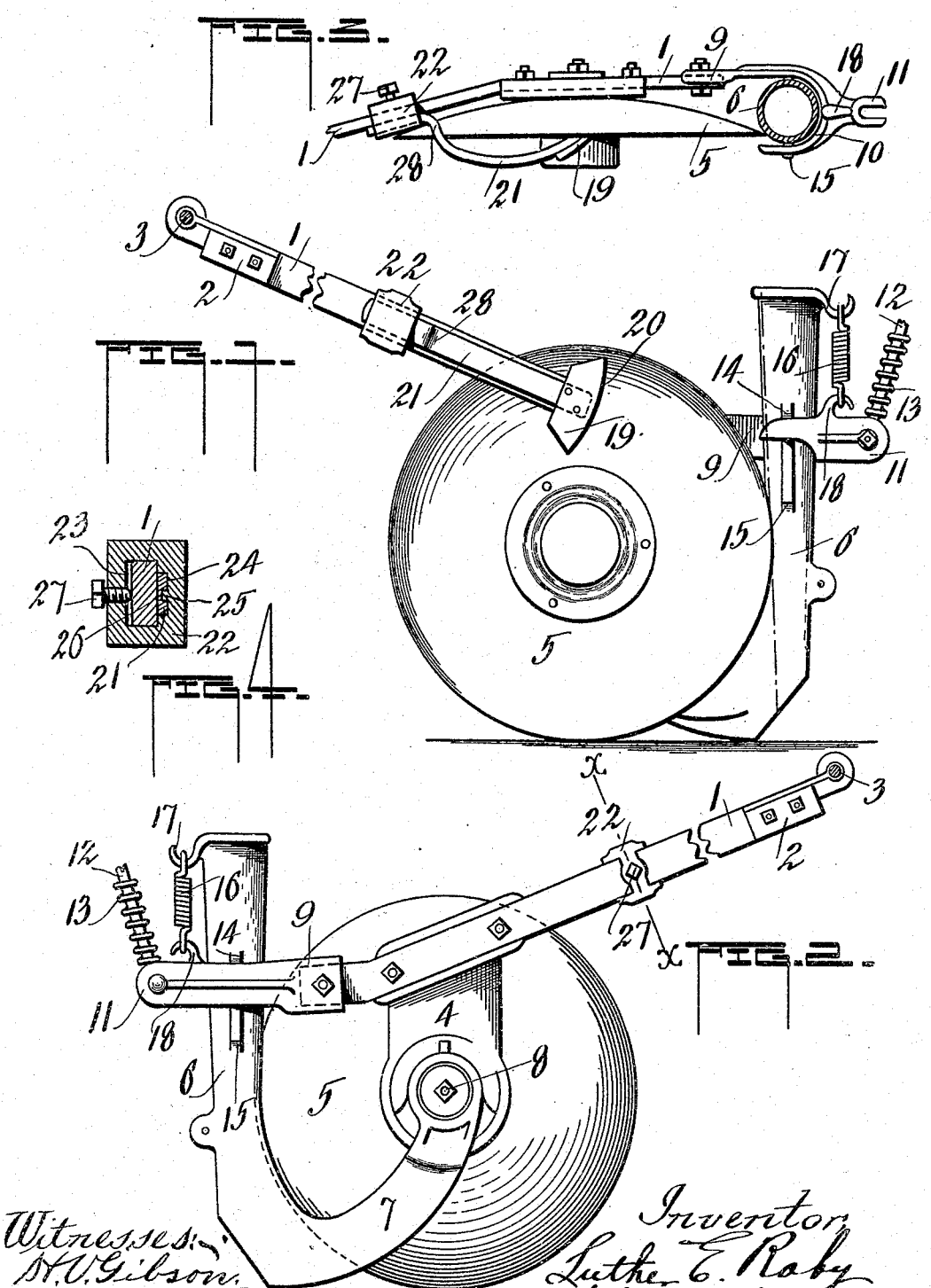

LUTHER E. ROBY, OF PEORIA, ILLINOIS.

AGRICULTURAL MACHINE.

941,465.

Specification of Letters Patent. Patented Nov. 30, 1909.

Application filed March 23, 1908. Serial No. 422,855.

*To all whom it may concern:*

Be it known that I, LUTHER E. ROBY, a citizen of the United States, residing at Peoria, in the county of Peoria and State of Illinois, have invented certain new and useful Improvements in Agricultural Machines; and I do hereby declare that the following is a full, clear, and exact description of the invention, which will enable others skilled in the art to which it appertains to make and use the same.

This invention has reference to certain new and useful improvements in agricultural machines wherein disk furrow openers are employed, and particularly to a scraping-blade adapted to have contact with the disks. Said scraping-blades are attached to means longitudinally adjustable on the supports for said disks.

The invention consists further in combining with a disk furrow opener and its support, a scraping-blade adapted to have contact with the concave face of the disk, a spring-blade to which the scraping-blade is attached, the said spring-blade connected with an attachment slidably secured to the support of the said disks.

While the invention herein is applicable to several forms of agricultural machines employing disk furrow openers, I have preferred to show the same in connection with a disk furrow opener and its support similar to that shown in the patent to Roby and Pattison dated Sept. 19, 1905, numbered 799,676, and certain improvements to be more specifically described have been made between the connection of the disk support and grain-boot or conductor shown in the above said patent.

The invention consists, further, in the provision of details more particularly set out in the following description, claimed in the appended claims, and illustrated in the accompanying drawings, in which:—

Figure 1 is a side elevation of a disk furrow opener, looking at the concave face thereof, the support of the said disk, the grain-boot attached thereto, and the scraping-blade in contact with the disk and the manner of supporting the same upon the support of the disk; Fig. 2 is a side elevation looking at the opposite side of the parts seen in Fig. 1; Fig. 3 is a plan view of Fig. 1, with the forward end of the drag-bar broken away, certain other parts omitted, and the grain-boot shown in transverse sections, and Fig. 4 is a cross-section on an enlarged scale taken on the line X—X of Fig. 2.

This application is filed as a substitute for the application filed by me on November 15, 1905, bearing Serial No. 288,063.

Like numerals of reference refer to corresponding parts throughout the figures.

In the drawings 1 indicates a drag-bar or support of suitable length connected at its forward end with a head 2, which has a pivotal connection with a rod or spindle 3, which may be suitably supported or attached to the frame of any of the well known grain drills. In this connection, it has not been thought necessary to show the supporting frame for grain drills of the character specified herein, as such frame or the parts thereof do not form any part of the invention herein, except as forming a support or connection for the drag-bar 1 and it is thought that the connection of the head 2 with the spindle 3 is sufficient to show a connection for the drag-bar.

At a suitable point on the body of the drag-bar 1 is fixedly attached a bracket or support 4, which depends from the said drag-bar and the same is provided with a suitable bearing on which a disk 5 is rotatably carried. The disk 5 is similar to disks used in machines of this character having concave and convex faces; and in mounting the disk of the bearing of the bracket or support 4 it will be noticed that the convex face of the disk is carried in juxtaposition to the inner face of the bracket 4 referred to.

The grain-boot or conductor to which attention has been called is indicated as 6 and has attached thereto or cast integral therewith the forwardly and upwardly carried shoe or arm 7 which at its upper end is adapted to have a pivotal connection at 8 with the support 4 and journal of the said disk, diametric with the axis of the said disk, whereby the said conductor is adapted to have an oscillatory movement independent of the said disk or its support. It is here noted that the connection of the support 4 with the drag-bar, the form of the bearing of the said support and the manner of connecting the disk thereto and the connection between the shoe or arm of the grain-boot with the support 4 and disk, are in all respects similar to and constructed substantially like that shown in the patent above referred to, and inasmuch as these connections are not specifically claimed here-in it is not thought necessary to detail the parts and connections as above specified.

In the drawings the drag-bar 1 is shown extending beyond the bracket 4 and at a point between the bracket and the grain-boot 6 the said drag-bar terminates and has connected therewith an arm 9 provided with the yoke-portion 10 which partially encircles the grain-boot 6, as shown in the drawings and extending outwardly from the yoke-portion from the arm is seen a pair of ears 11 between which and to which is pivotally connected the lower end of a rod 12 about which is a coil spring 13. The rod 12, although the connections are not shown, is adapted to have suitable connection with a rock-shaft which may be suitably operated for the purpose of raising and lowering the drag-bar, disk and boot through the connection of the rod 12; spring 13, as in constructions of this character may be employed for exerting more or less pressure upon the disk in the ground. The rod 12 just referred to is similar to and serves the same office as the corresponding parts shown in the patent above referred to, and it is not thought necessary to go into further detail relating thereto, its connection or the manner of operating the same with usual parts of the well known type of grain drills.

The grain-boot 6 is provided with a pair of lugs 14 and 15 projecting laterally therefrom, which may be duplicated upon opposite sides if it is so desired and disposed in such a manner as to be engaged by the yoke-portion 10 of the arm 9. With the use of the lugs 14 and 15 the spring 13 may be omitted, if desired, and when the disk is depressed into the ground, the boot and shoe of their own weight will drop and follow the downward movement of the disk, the lug 14 serving as an engaging point for the yoke-portion of the drag-bar when raising the disk and the lug 15 serving as an engaging point for the drag-bar when the disk is depressed, should the boot and shoe fail to correspond with the movement of the disk by their own weight in the manner specified. Forming a yielding connection between the grain-boot and the yoke-portion of the arm 9 of the drag-bar is a pulling spring 16, connected at its upper end to the hook 17 of the boot and at its lower end to the hook 18 of the yoke of the arm 9, so that in the downward movement of the yoke and drag-bar when pressure is applied to the same, the boot will also be depressed or drawn downwardly through the connection of the said spring between the boot and the yoke of the arm. And through the provision of the pivotal connection of the arm of the boot with the disk and its support the said boot is adapted to rise and fall independently of the said disk or with the same and in working position remains with its lowermost portion traveling in the wake of the disk and on a level with the lowermost cutting edge of the disk.

Referring now to the scraping-blade described as adapted to have contact with the disk, the same is indicated as 19 having the scraping edge 20 and suitably secured to the rear end of a bar or blade 21, preferably a spring-blade. The said bar 21 extends longitudinally and parallel with the drag-bar 1 and its forward end lies adjacent thereto. For clamping the bar or blade 21 whereby the same is slidably connected with the drag-bar 1, I employ the sliding block 22 having the enlarged rectangular opening 23 through which the drag-bar is carried and the reduced opening 24 forming a seat in which the bar or blade 21 is carried. The block 22 is provided with the interiorly projected pin 25 which is adapted to engage a perforation 26 in the bar or blade 21, which serves to securely retain the bar 21 in a fixed position relative to its connection with the block 22 and the draw-bar 1. Under certain conditions the scraping-blade in its contact with the disk might possibly be dislodged from its engagement with the disk were it not that the pin 25 was employed to hold it against longitudinal movement. For clamping the bar 21 and the block 22 to the draw-bar the set screw 27 is used and operates substantially as seen in Fig. 4. The openings through the block 22 are of such a width that when it is desired to place the bar or blade 21 or disconnect it from the block and the draw-bar, upon loosening the set screw 27 the block 22 may be moved laterally on the draw-bar which will permit the bar or blade 21 to be inserted into the block when the pin will engage the opening in the bar or disengage the said bar from the block and its pin.

Disposing the convex face of the disk adjacent to the draw-bar, the spring blade 21 is bent outwardly from the draw-bar at a point 28 as shown in Fig. 3 then carried rearwardly and inwardly toward the face of the disk and while the spring-blade 21 is held against longitudinal movement until the loosening of the nut 27 which attaches the parts to be slidably adjusted on the draw-bar, the spring-plate holds the scraper yieldingly in contact with the face of the said disk. In the adjustment of the block 22 on the draw-bar it will be seen that I am enabled to place the scraping blade in contact with the disk or withdraw it to prevent such contact when the ground is in such a condition that it is unnecessary to use the scraping blade. It will be noted by the examination of the drawings that the scraping blade contacts with the disk at a point in vertical alinement with the axis of the disk and above the same, this arrangement is found to be more convenient, more desirable and operates with better satisfaction than where the scraper contacts with other and various points of the disk.

Attention is further called to the construction of the rear end of the draw-bar, where it is shown that the arm provided with the yoke-portion is connected to the main portion of the said draw-bar. The main body of the draw-bar when the same is operatively connected with the frame parts of a drill is disposed in an inclined position, whereas, its lower rear end is bent to extend in a substantially horizontal plane and the arm 9 with its yoke 10 attached thereto lies also in the same plane. This is found to be a most convenient arrangement because of the fact the grain conductor stands in a substantially vertical position. With the yoke partially surrounding the said conductor it prevents any lateral movement of the same and retains the conductor in the same relation to the cutting edge of the disk at all times.

I wish it understood that I have shown the preferred construction of the disk, boot and support to which it is desired to attach the scraping-blade and its supporting member, the scraping-blade and its member is not necessarily confined to such an application as it is applicable to, and will work equally as well in connection with other forms of disks and their supports; also that the construction of the boot and its connection with the draw-bar and also with operative parts of full size drill may be modified and come within the scope and principle of invention herein.

Having thus fully described my invention, what I claim and desire to secure by Letters Patent of the United States, is:—

1. In a device of the character described, the combination of a pivoted drag-bar, a disk carried by the said bar, a block slidably adjustable on the said bar, a scraping-blade adapted to have contact with the said disk, and connecting means between the scraping-blade and the block aforesaid.

2. In a device of the character described, the combination of a support, a disk carried by the said support, a block slidably adjustable on the said support, a scraping-blade adapted to have contact with the said disk, connecting means between the scraping-blade and the block aforesaid, and means carried by the block for locking the connecting means between the scraping-blade and the said block against longitudinal displacement.

3. In a device of the character described, the combination of a support, a disk carried by the said support, a block slidably connected with the support, a scraping-blade adapted to have contact with the said disk, a spring-blade to which the scraping-blade is attached, said spring-blade adapted to be secured within the said block and adjacent to the said support.

4. In a device of the character described, the combination of a support, a disk carried by the support, a block slidably connected with the support and means for securing the block in adjusted positions, a scraping-blade adapted to have contact with the said disk, a spring-blade to which the scraping-blade is attached, said spring-blade adapted to be secured within the said block and adjacent to the said support.

5. In a device of the character described, the combination of a support, a disk carried by the support, a block slidably connected with the support, and means for securing the block in adjusted positions, a scraping-blade adapted to have contact with the said disk, a bar to which the scraping-blade is attached, the said bar secured to the support by means of the block aforesaid, and having a perforation, and a pin on the said block adapted to engage the perforation in said bar.

6. In a device of the character described, the combination of a support, a disk attached to the said support, a block slidably adjustable on the said support, means for securing the block in adjusted positions, a bar carried parallel with the support and having one end secured to the support by means of the block, the said bar extending outwardly from the support, rearwardly and inwardly to a point near the disk, and a scraping-blade adapted to contact with the disk and attached to the said bar.

7. In a device of the character described, the combination of a drag-bar, a support depending therefrom, a disk journaled on said support, a grain-boot pivotally connected with the support of the disk, an arm attached to the drag-bar and having a yoke-portion partially surrounding the grain-boot, and means on the boot adapted to be engaged by the yoke-portion of the arm aforesaid.

8. In a device of the character described, the combination of a drag-bar, a support depending therefrom, a disk journaled on said support, a grain-boot having a pivotal connection with the support diametric with the axis of the disk, an arm attached to the drag-bar and having a yoke-portion partially surrounding the grain-boot, and a yielding connection between the boot and the yoke-portion of said arm.

9. In a device of the character described, the combination of a pivoted drag-bar disposed in an inclined position, a support depending from the drag-bar, a grain-boot having an upwardly and forwardly extended portion pivotally connected with the said support, an arm attached to the drag-bar and disposed in substantially a horizontal position, the same having a yoke-portion partially surrounding the grain-boot and a yielding connection between the grain-boot and the yoke-portion of said arm.

In testimony whereof I affix my signature, in presence of two witnesses.

LUTHER E. ROBY.

Witnesses:
CHAS. W. LA PORTE,
ROBT. N. McCORMICK.